United States Patent
Heath (10) Patent No.: US 9,135,125 B1
(45) Date of Patent: *Sep. 15, 2015

(54) DISTRIBUTED UNINTERRUPTIBLE POWER SUPPLY

(71) Applicant: Google Inc., Mountain View, CA (US)

(72) Inventor: Taliver Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,822

(22) Filed: Jul. 15, 2014

Related U.S. Application Data (63) Continuation of application No. 13/165,227, filed on Jun. 21, 2011, now Pat. No. 8,812,881.

(51) Int. Cl.
*G06F 1/26* (2006.01)
*G06F 11/20* (2006.01)

(52) U.S. Cl.
CPC .................................. *G06F 11/2015* (2013.01)

(58) Field of Classification Search
None
See application file for complete search history.

(56) References Cited

U.S. PATENT DOCUMENTS

| | | | |
|---|---|---|---|
| 5,914,585 A | 6/1999 | Grabon | |
| 6,820,206 B1 | 11/2004 | Kim et al. | |
| 8,271,806 B1 | 9/2012 | Xiao et al. | |
| 8,812,881 B1 * | 8/2014 | Heath | 713/300 |
| 2003/0037150 A1 | 2/2003 | Nakagawa | |
| 2005/0162018 A1 | 7/2005 | Realmuto et al. | |
| 2008/0178032 A1 | 7/2008 | Walrath | |

* cited by examiner

*Primary Examiner* — Paul Yanchus, III
(74) *Attorney, Agent, or Firm* — Lerner, David, Littenberg, Krumholz & Mentlik, LLP (57) ABSTRACT

A distributed uninterruptible power supply provides power to a system including a plurality of electronic computing devices. Each electronic computing device may include an on-board battery to provide power when a power outage occurs. The electronic computing devices that are executing processes that may be temporarily suspended without adversely impacting the processing of a majority of the plurality electronic computing devices may be identified as sacrificial devices. The motherboard of each sacrificial device may be deactivated to suspend any executing processes. The DC power provided by the on-board battery of each sacrificial device may be converted to AC power and then supplied to the non-sacrificial devices.

20 Claims, 4 Drawing Sheets

DISTRIBUTED UNINTERRUPTIBLE POWER SUPPLY

CROSS-REFERENCE TO RELATED APPLICATIONS

The present application is a continuation of U.S. patent application Ser. No. 13/165,227, filed Jun. 21, 2011, the disclosure of which is incorporated herein by reference.

BACKGROUND

Generators are often used to supply electric power in the event of a power outage. Electronic devices that previously received power from a primary power source subsequently obtain power input from the generator until the power outage ceases. In most cases, the power provided to the electronic devices is not interrupted when the generator is activated. However, the dependence on generators to meet power demands during an outage has proven to be unreliable. Since generators may not be operated or tested frequently, many generators may not function as expected when activated.

SUMMARY

Aspects of the present disclosure relate generally to a distributed uninterruptible power supply that provides power to a system including a plurality of electronic computing devices. Each electronic computing device includes an on-board battery that may provide power temporarily when a power outage occurs. A determination is made to identify which electronic computing devices may be sacrificed, i.e., taken off-line without adversely impacting system operations. The motherboard of each identified sacrificial device is deactivated to suspend any executing processes. The direct current (DC) power provided by the on-board battery of each sacrificial device is converted to alternating current (AC) and then supplied to the non-sacrificial devices. Accordingly, the on-board batteries of the sacrificial devices operate as a distributed uninterruptible power supply to provide power to the non-sacrificial devices until the power outage ceases.

In one aspect, a computer-implemented method includes receiving an indication that a power outage occurred. Using a processor, an identification is made about which of a plurality of electronic devices are sacrificial devices. Processing in the sacrificial devices may be suspended without adversely impacting processing of a majority of the plurality of the electronic devices. The processing of the sacrificial devices is deactivated, and alternating current (AC) power is supplied from the sacrificial devices to the non-sacrificial devices.

In another aspect, a system includes a plurality of electronic devices and a main server coupled to the plurality of electronic devices. In response to receiving an indication that a power outage occurred, the main server is configured to identify which of the electronic devices are sacrificial devices. Processing in the sacrificial devices may be suspended without adversely impacting processing of a majority of the plurality of the electronic devices. The main server generates a signal and transmits the signal to the sacrificial devices to deactivate processing of the sacrificial devices. AC power is supplied from the sacrificial devices to the non-sacrificial devices.

In another aspect, a computer-implemented method for providing a distributed uninterruptible power supply includes receiving an indication that a power outage occurred. Using a processor, an identification is made about which of a plurality of electronic devices are sacrificial devices. Processing in the sacrificial devices may be suspended without adversely impacting processing of a majority of the plurality of the electronic devices. Each electronic device comprises a battery. The processing of the sacrificial devices is deactivated. An inverter circuit is coupled to the battery for each sacrificial device. The inverter circuit converts DC power from the battery to AC power supplied to the non-sacrificial devices.

DETAILED DESCRIPTION

The present disclosure is directed to a distributed uninterruptible power supply. In one illustrative example, a data storage center commonly utilizes a system of hundreds or thousands of electronic computing devices (e.g., servers and other data storage devices configured as a server farm) to store and retrieve data. Each electronic computing device includes an on-board battery that may provide power temporarily from the moment the power outage begins but before the generator becomes fully operative. In accordance with example implementations, the on-board batteries may be utilized as an alternate source of power to replace generators in the event of a power outage.

A global scheduler is utilized for the automated scheduling of system events, processes, and import and export of data. The global scheduler maintains a global schedule table that identifies which electronic computing devices are executing which processes. By referencing the global schedule table, a determination can be made as to which of the electronic computing devices may be taken off-line without having an adverse impact on system operations. Such electronic computing devices are referred to as "sacrificial" devices. In one implementation, the sacrificial devices are electronic computing devices that are executing processes that may be temporarily suspended without adversely impacting the processing of a majority of the other electronic computing devices.

When a power outage occurs, each electronic computing device temporarily receives power from the corresponding on-board battery. The global schedule table is then referenced to identify which electronic computing device may be sacrificed. The motherboard of each identified sacrificial device is deactivated such that the executing processes are suspended. The power provided by each on-board battery of each sacrificial device is converted from direct current (DC) to alternating current (AC) by, for example, an inverter circuit included in each electronic computing device. The AC power from each sacrificial device is then supplied to the non-sacrificial devices such that the non-sacrificial devices remain operative. Accordingly, the on-board batteries of the sacrificial devices operate as a distributed uninterruptible power supply to provide power to the non-sacrificial devices until the power outage ceases.

In example implementations, the global schedule table is continually monitored to determine whether electronic computing devices originally identified as being sacrificial devices are scheduled to perform functions that are necessary for the efficient execution of system operations. Similarly, a determination may be made by referencing the global schedule table to determine which electronic computing devices that were originally identified as non-sacrificial devices may subsequently be determined to be sacrificial devices. Accordingly, different electronic computing devices may provide AC power to the non-sacrificial devices and different electronic computing devices may receive AC power from the sacrificial devices throughout the power outage.

Figure 1:
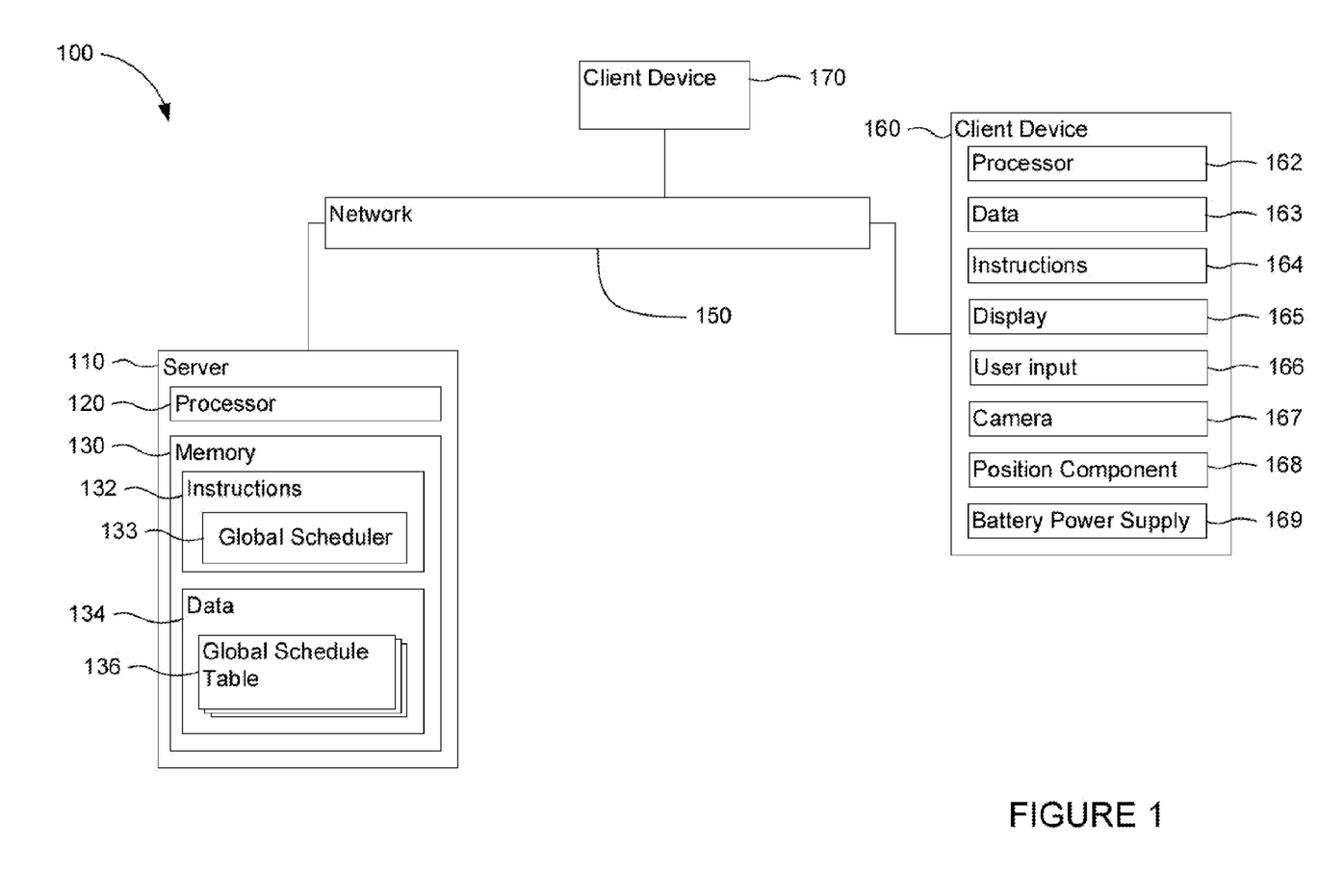
FIG. 1 is a functional diagram of a system in accordance with an example implementation.
Figure 2:
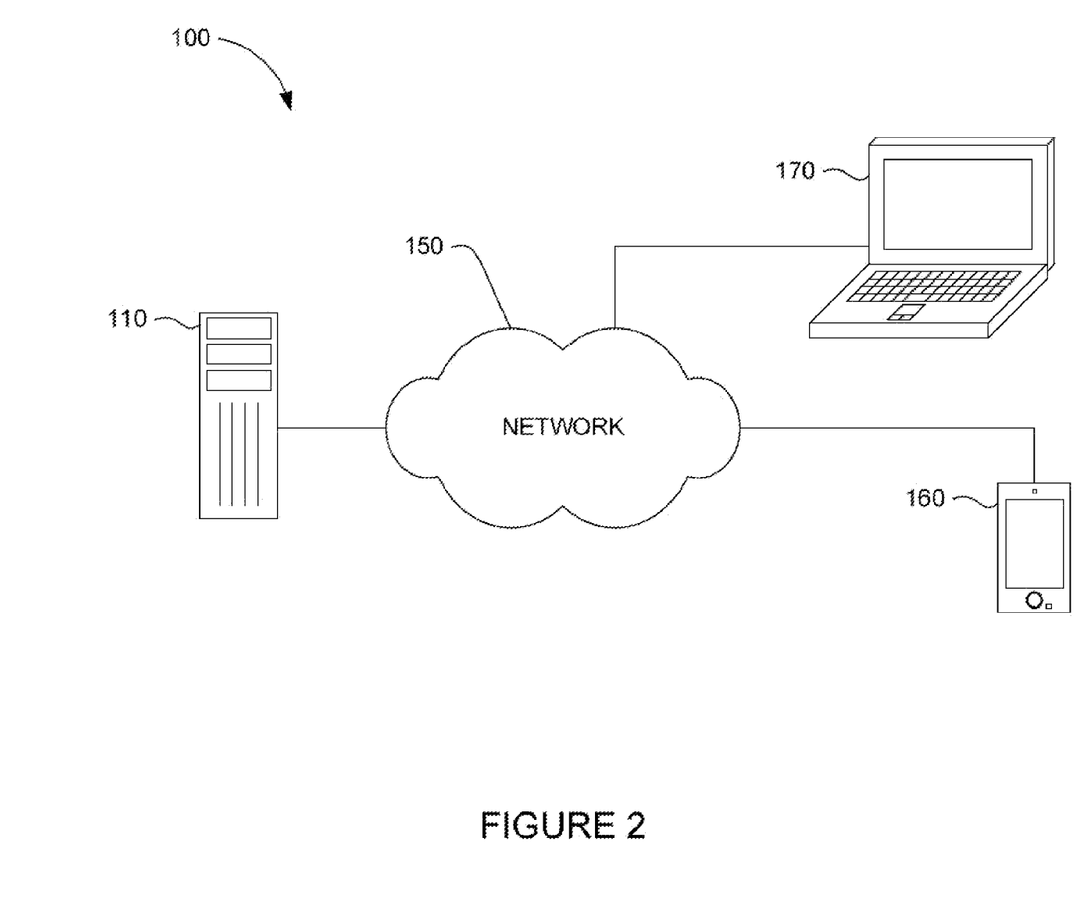
FIG. 2 is a pictorial diagram of the system of FIG. 1.

As shown in FIGS. 1 and 2, a system 100 in accordance with example implementations includes a computer 110 containing a processor 120, memory 130 and other components typically present in general purpose computers. The memory 130 stores information accessible by the processor 120, including instructions 132 and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

As described in detail below, the instructions 132 may include a global scheduler 133 and the data 134 may include a global schedule table 136. The global scheduler 133 is utilized for the automated scheduling of system events, processes, and data transfer. The global schedule table 136 identifies which devices coupled to the same network are executing which processes.

The processor 120 may be any conventional processor, such as processors from Intel Corporation or Advanced Micro Devices. Alternatively, the processor 120 may be a dedicated controller such as an ASIC. Although FIG. 1 functionally illustrates the processor 120 and memory 130 as being within the same block, it will be understood by those of ordinary skill in the art that the processor and memory may actually comprise multiple processors and memories that may or may not be stored within the same physical housing. For example, memory may be a hard drive or other storage media located in a server farm of a data storage center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160, 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices 160, 170. In this instance, the client devices 160, 170 will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1 and 2, it should be appreciated that a typical system can include a large number of connected computers.

Each client device 160 may be configured similarly to the server 110, with a processor, memory and instructions as described above. Each client device 160 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device 160 may also include a camera 167, geographical position component 168, accelerometer, speakers, a network interface device, a battery power supply 169 or other power source, and all of the components used for connecting these elements to one another.

Although the client devices 160, 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a netbook or a tablet PC capable of obtaining information via the Internet or other network. The user may input information using a small keyboard, a keypad, voice recognition or a touch screen.

In addition to the operations described below and illustrated in the figures, various operations in accordance with example implementations will now be described. It should also be understood that the following operations do not have to be performed in the precise order described below. Rather, various operations can be handled in a different order or simultaneously, and operations may be added or omitted.

Figure 3:
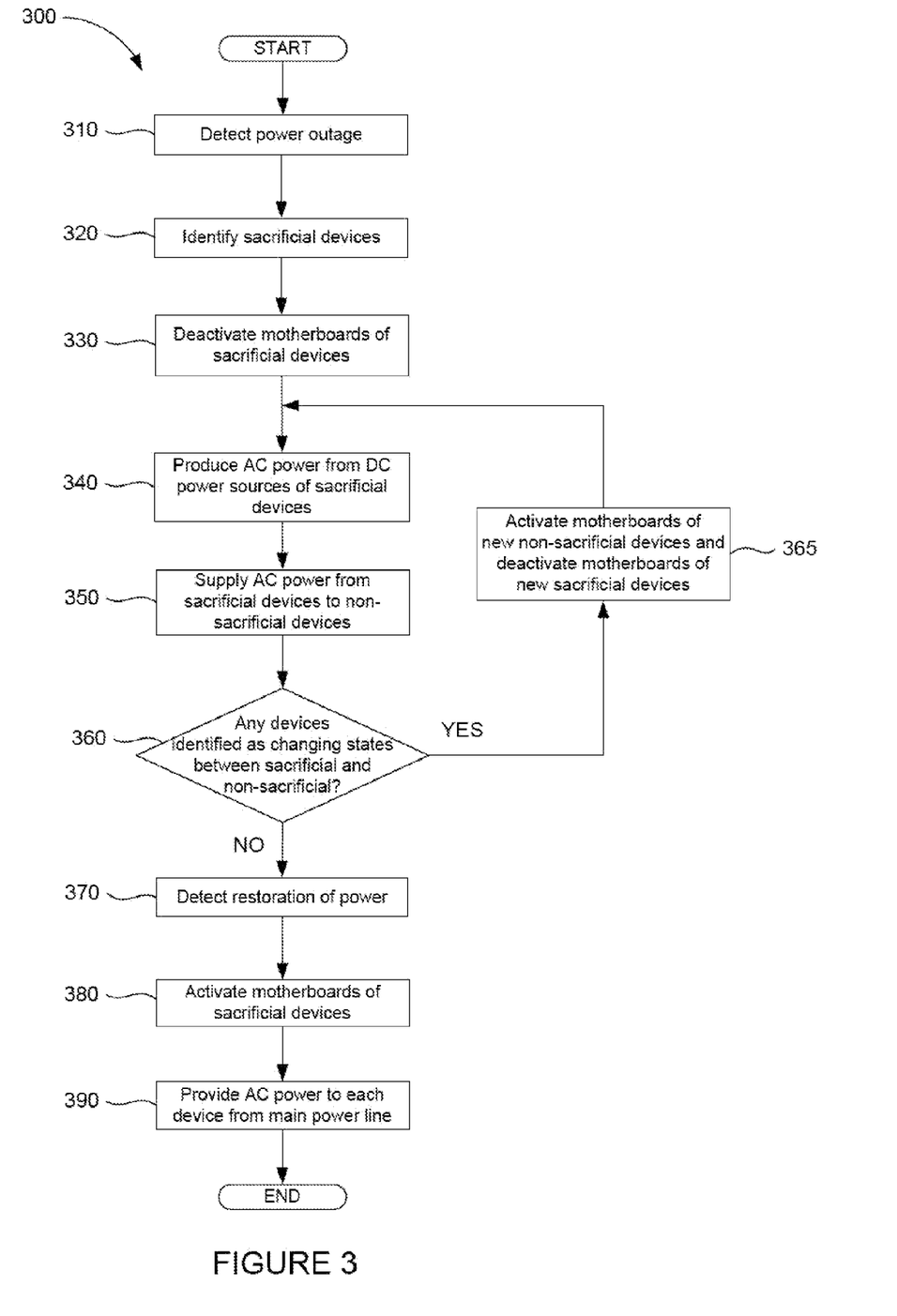
FIG. 3 is a flow diagram in accordance with example implementations.

FIG. 3 demonstrates a process 300 of providing a distributed uninterruptible power supply. In one illustrative example, the distributed uninterruptible power supply is used in a server farm of a data storage center. However, the distributed uninterruptible power supply may be used with any system that utilizes a plurality of electronic computing devices at least some of which include on-board batteries to provide AC power to the other electronic computing devices.

In normal operation, electronic computing devices coupled to the same network in the same vicinity of each other commonly receive AC power from a primary power supply such as a utility provider. Computer systems and other electronic devices containing logic circuitry are susceptible to data loss or hardware damage that may be caused by the sudden loss of power. To protect against this, an uninterruptible power supply provides a constant flow of electricity in the event that a primary power supply becomes unavailable to the system.

The process 300 begins when a power outage is detected (block 310). The power outage may be due to any event that causes the loss of electric power to the system. Example causes of power failure include faults at power stations, damage to electric transmission lines, substations or other parts of a power distribution system, a short circuit, or the overloading of electric mains. The power outage may be detected at the system by a line sensing disconnect between the primary power supply and the system. When the power outage is detected, the line sensing disconnect decouples the system from the main power line and transmits a signal to a main server of the system that a power outage has been detected. Each electronic computing device may temporarily receive power from the corresponding on-board battery when the power outage is initially detected.

In response to receiving the signal indicating that a power outage has occurred, the main server accesses a global scheduler to identify which electronic devices may be identified as sacrificial devices (block 320). The global scheduler provides automated scheduling of system events, processes, and the import and export of data. The global scheduler maintains a global schedule table to identify the different processes that are executing on the different electronic devices. The global schedule table is accessed to identify which of the electronic devices are executing processes that may be suspended during the power outage without adversely impacting the processing of a majority of the other electronic computing devices. These identified electronic devices are referred to as sacrificial devices. In some implementations, as many as one-third of the electronic devices may be identified as sacrificial.

Once the sacrificial devices are identified, the main server transmits a deactivation signal to the sacrificial devices to deactivate the motherboards of the sacrificial devices (block 330). The deactivated motherboards of the sacrificial devices result in the suspension of whatever processes that were being executed on the sacrificial devices. A switch activated in response to the deactivation signal causes a battery charger circuit of each sacrificial device to be decoupled from the battery and replaced with an inverter circuit. The inverter circuit of each sacrificial device converts the DC power from the on-board battery to AC power (block 340).

The sacrificial devices supply AC power to the non-sacrificial devices from a common power line shared between the electronic devices (block 350). The non-sacrificial devices detect the AC power at the shared power line. In response, each non-sacrificial device switches from receiving DC power from its own on-board battery to receiving AC power from the shared power line. The non-sacrificial device does not distinguish between AC power received from the primary power supply and AC power received from the sacrificial devices. In other words, from an input power perspective at the non-sacrificial devices, it appears as if power has been restored to the system.

In some implementations, the power outage may continue for an extended time period causing some of the on-board batteries of the sacrificial devices to approach complete discharge. In addition, the processes that were suspended on the sacrificial devices when the power outage first occurred may require continuation to promote overall efficiency of the system. Likewise, the processes executing on the non-sacrificial devices that were determined to take precedence over the processes executing on the sacrificial devices may no longer require execution as the power outage continues. Accordingly, the global scheduler continually references the global schedule table to determine whether any of the electronic devices that were previously identified as sacrificial should now be identified as non-sacrificial, and vice versa (block 360). In some implementations, a sacrificial device that has an on-board battery that has completely or nearly discharged may be identified as non-sacrificial. In the event that any of the devices have changed state between sacrificial and non-sacrificial, processing continues to block 365; otherwise processing moves to block 370.

The motherboards are reactivated for those electronic devices that were previously identified as sacrificial but have subsequently been identified as non-sacrificial, and the motherboards are deactivated for those electronic devices that were previously identified as non-sacrificial but have subsequently been identified as sacrificial (block 365). As stated above, when a motherboard is deactivated, the battery is decoupled from a charger circuit and is coupled to an inverter circuit. When a motherboard is reactivated, the inverter circuit is decoupled from the battery and the battery may be re-coupled to the charger circuit. Processing then returns to block 340 such that the identification of which devices are sacrificial may change over time to promote efficient process execution until power is restored from the primary power supply.

The restoration of primary power is detected (block 370). The line sensing disconnect may detect that the power outage has ceased and transmit a signal to the main server indicating that the primary power supply has been restored to the system. In response, the main server transmits a signal to the electronic devices such that the motherboards of the sacrificial devices are reactivated (block 380). As stated above, when a motherboard is reactivated, the on-board battery is decoupled from the inverter circuit and re-coupled to the charger circuit. AC power is then supplied to each electronic device via the main power line (block 390).

Figure 4:
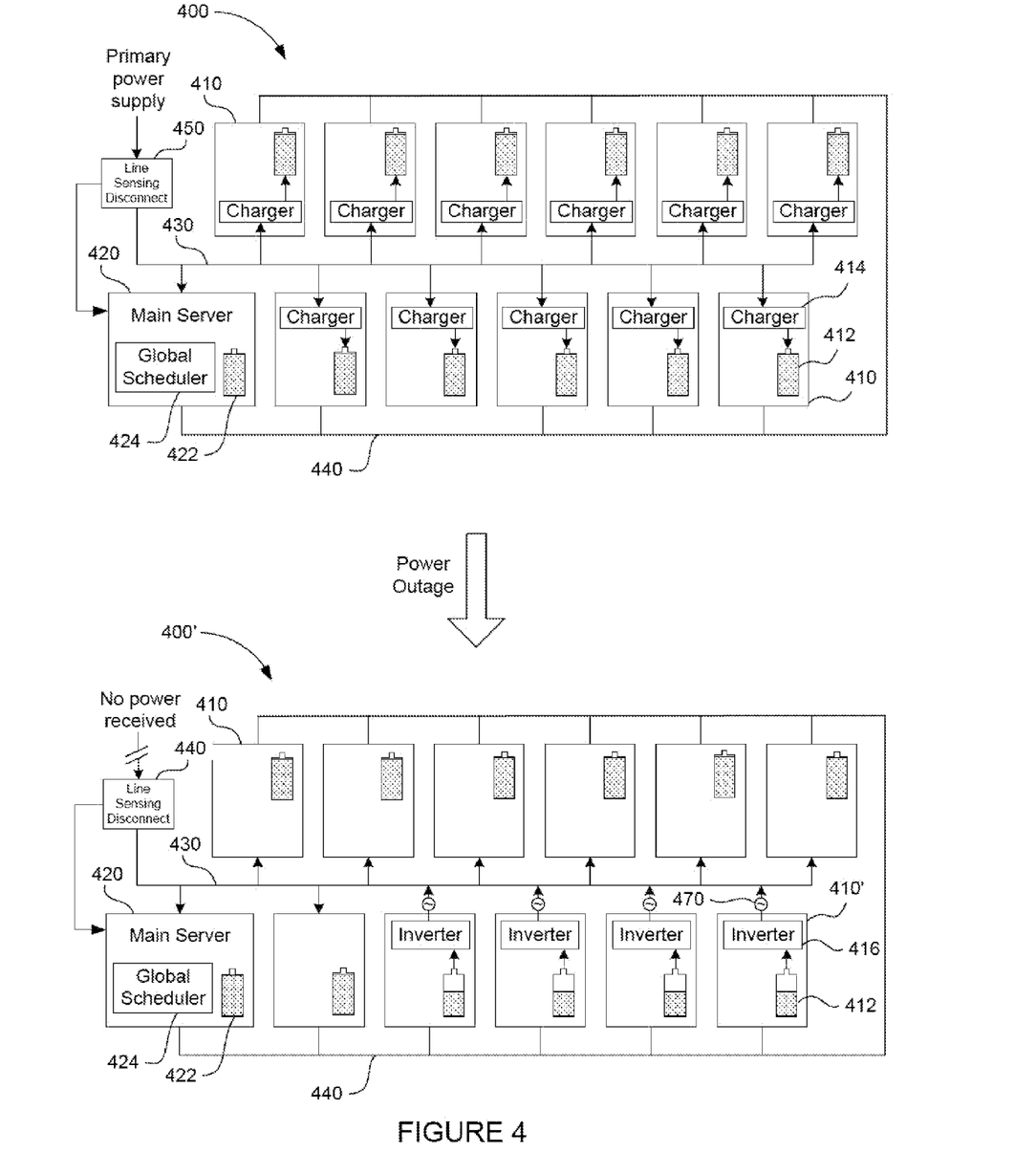
FIG. 4 illustrates an uninterruptible power supply in accordance with example implementations.

FIG. 4 illustrates a system for providing a distributed uninterruptible power supply in accordance with example implementations. The system 400 includes a plurality of electronic computing devices 410. Each electronic device 410 includes an on-board battery 412 and a charger circuit 414. In one illustrative implementation, the system is used in a data storage center and the plurality of electronic devices comprises a server farm for storing and retrieving data. However, the electronic devices 410 may be any type of device that may be configured to supply AC power from its on-board battery 412. One of the electronic devices may be configured as a main server 420 including its own on-board battery 422. The main server 420 also includes a global scheduler 424.

In normal operational mode, main power is supplied as AC power to the electronic devices 410 and the main server 420 from a primary power supply via an AC power line 430. The primary power supply is usually provided by a utility company. The AC power line 430 is coupled to the electronic devices 410 and the main server 420. The charger circuit 414 of each electronic device 410 charges the corresponding on-board battery 412 such that when a power outage occurs, the batteries 412 are charged and may be available to provide power to the other electronic devices 410. A data bus 440 is provided between the main server 420 and the electronic devices 410 such that the main server 420 may communicate with the other electronic devices 410, and the electronic devices 410 may communicate with each other via the data bus 440.

A line sensing disconnect 450 is provided between the primary power supply and the remainder of the system 400. The line sensing disconnect 450 is configured to identify when a power outage occurs. When the power outage first occurs, each electronic device 410 receives power from its own on-board battery 412, and the main server 420 is also powered by its own on-board battery 422.

When the line sensing disconnect 450 identifies a power outage to the system 400, a signal is transmitted to the main server 420 such that the system 400 may be reconfigured as a system 400' with a distributed uninterruptible power supply. The global scheduler 424 maintains and accesses a global schedule table to identify which electronic devices 410 may be identified as sacrificial devices. The global schedule table identifies which electronic devices are executing which processes, and the global scheduler 424 accesses the global schedule table to determine which electronic devices are executing processes that may be suspended without adversely impacting the processing of a majority of the other electronic computing devices. The electronic devices 410 that are performing functions that are not critical to system operation, or that may otherwise be taken off-line, are identified as sacrificial devices.

In response to the global scheduler 422 determining which electronic devices 410 are not performing high-priority functions, the main server 420 generates a signal identifying which devices are deemed sacrificial devices. The signal is transmitted to the electronic devices 410 via the data bus 440. When one of the electronic devices 410 receives the signal that identifies the device as being a sacrificial device, the electronic device is reconfigured as sacrificial device 410' to provide AC power to the AC power line 430, as discussed below.

The motherboards of the sacrificial devices 410' are deactivated in response to receiving the signal from the main server 420 such that data processing functions may cease for each sacrificial device 410'. A switch is activated to decouple the charger circuit 414 from the on-board battery 412 and to couple an inverter circuit 416 to the on-board battery 412. Each inverter circuit 416 converts DC power from the corresponding on-board battery 412 to AC power 470. The AC power 470 is then provided to the power line 430.

The electronic devices 410 that are not identified as sacrificial devices may detect that power is available at the power line 430 due to the activation of the inverter circuits 416 in the sacrificial devices 410'. Each non-sacrificial electronic device 410 switches power sources from the on-board battery 412 to the power line 430. The non-sacrificial electronic devices 410 continue to receive the AC power 470 from the sacrificial devices 410' until the outage ends and power is restored. In some implementations, the charger circuits 414 in the non-sacrificial electronic devices 410 are deactivated when receiving power from the sacrificial devices 410' to conserve power.

In some implementations, the on-board batteries 412 of the sacrificial electronic devices 410' may completely or nearly discharge before the power outage ceases. In this case, each non-sacrificial device 410 may switch back to receiving power from their own on-board battery 412 until the power outage ceases.

In some implementations, the electronic devices 410 that are identified as sacrificial devices 410' may change over the course of the power outage. In one illustrative example, when the power outage first occurs, approximately one-third of the electronic devices may be identified as sacrificial devices 410' that provide AC power to the other two-thirds of the non-sacrificial devices 410. As the power outage continues, the global scheduler 424 may access the global schedule table and determine that some of the electronic devices that were initially identified as sacrificial should be reactivated in order for the system to execute more efficiently. For example, one of the electronic devices may have been executing a process that was previously suspended so that the device could generate AC power during the power outage. However, other processes executing on other devices may be awaiting a result of the suspended process in order to complete execution of a system function. In this case, the electronic device that was originally identified as sacrificial may be switched back to a non-sacrificial device such that the process may be executed to promote system efficiency. The global scheduler 424 may then identify a different electronic device that was initially identified as non-sacrificial but has since not been executing a process that is necessary to advance system operations. In this case, the global scheduler 424 may identify this electrical device as a sacrificial device to provide AC power to the AC power line 430.

Once power is restored, the line sensing disconnect 450 provides a signal to the main server 420 to indicate that power is available once again from the primary power supply. The main server 420 provides a signal to the electronic devices 410, 410' such that the sacrificial electronic devices 410' no longer generate AC power 470 from their on-board batteries 412. Specifically, a switch is activated in the sacrificial devices 410' such that the charger circuits 414 are coupled to the on-board batteries 412 replacing the inverter circuits 416. Accordingly, all of the electronic devices 410 return to receiving power from the primary power supply such that the on-board batteries 412 that may have discharged during the power outage are recharged and normal system operations may continue.

As described above, a distributed uninterruptible power supply provides power to a system of hundreds or thousands of electronic computing devices. Each electronic computing device includes an on-board battery that may provide power temporarily from the moment a power outage begins. A global schedule table may be referenced to identify which electronic computing device may be sacrificed, e.g., taken off-line without adversely impacting system operations. The motherboard of each identified sacrificial device is deactivated such that the executing processes are suspended. The power provided by each on-board battery of each sacrificial device is converted from DC to AC. The AC power from each sacrificial device is then supplied to the non-sacrificial devices such that those devices remain operative. Accordingly, the on-board batteries of the sacrificial devices operate as a distributed uninterruptible power supply to provide power to the non-sacrificial devices until the power outage ceases.

As these and other variations and combinations of the features discussed above can be utilized without departing from the scope of the claims, the foregoing description of exemplary implementations should be taken by way of illustration rather than by way of limitation as defined by the claims. It will also be understood that the provision of example implementations (as well as clauses phrased as "such as," "e.g.", "including" and the like) should not be interpreted as being limited to the specific examples; rather, the examples are intended to illustrate only some of many possible aspects.

The invention claimed is:

1. A method comprising:
receiving, using one or more computing devices, an indication that a power outage occurred;
identifying, using the one or more computing devices, which of a plurality of electronic devices is a sacrificial device, wherein processing in the sacrificial device may be suspended;
deactivating, using the one or more computing devices, the processing of the sacrificial device;
supplying, using the one or more computing devices, alternating current (AC) power from the sacrificial device to one or more non-sacrificial devices; and
identifying, using the one or more computing devices, the sacrificial device as a new non-sacrificial device when one or more processes associated with the one or more non-sacrificial devices are awaiting a result of a suspended process of the sacrificial device;
activating, using the one or more computing devices, the new non-sacrificial device.

2. The method of claim 1, wherein the deactivating comprises deactivating motherboards of the sacrificial device.

3. The method of claim 1, wherein each electronic device comprises a battery, the method further comprising, for the sacrificial device:
decoupling a charger circuit from the battery; and
coupling an inverter circuit to the battery, wherein the inverter circuit converts direct current (DC) power from the battery to the AC power to be supplied to the one or more non-sacrificial devices.

4. The method of claim 1, further comprising: identifying, using the one or more computing devices, as a new sacrificial device an electronic device that was previously not identified as a sacrificial device;
deactivating, using the one or more computing devices, processing of the electronic device identified as the new sacrificial device; and
supplying, using the one or more computing devices, AC power from the new sacrificial device to at least the new non-sacrificial device.

5. The method of claim 1, further comprising:
detecting, using the one or more computing devices, the power outage; and
generating, using the one or more computing devices, the indication that the power outage occurred.

6. The method of claim 1, further comprising:
detecting, using the one or more computing devices, an end to the power outage; and
activating, using the one or more computing devices, motherboards of the sacrificial devices.

7. A system comprising:
a plurality of electronic devices; and
a main server coupled to the plurality of electronic devices, wherein, in response to receiving an indication that a power outage occurred, the main server is configured to identify which of the electronic devices is a sacrificial device, wherein processing in the sacrificial device may be suspended,
wherein the main server generates a signal and transmits the signal to the sacrificial device to deactivate processing of the sacrificial device,
wherein AC power is supplied from the sacrificial device to one or more non-sacrificial devices,
wherein the sacrificial device is identified as a new non-sacrificial device when one or more processes associated with the one or more non-sacrificial devices are awaiting a result of a suspended process of the sacrificial device, and
wherein the new non-sacrificial device is activated.

8. The system of claim 7, wherein the main server comprises a global scheduler that is configured to maintain a global schedule table, wherein the global scheduler accesses the global schedule table to identify which of the plurality of electronic devices is the sacrificial device.

9. The system of claim 7, wherein the main server deactivates the processing of the sacrificial device by deactivating motherboards of the sacrificial device.

10. The system of claim 7, further comprising a line sensing disconnect configured to:
detect the power outage; and
generate the indication that the power outage occurred.

11. The system of claim 7, further comprising a line sensing disconnect configured to detect an end to the power outage, wherein, in response to receiving a signal from the line sensing disconnect that the power outage has ceased, the main server is configured to activate motherboards of the sacrificial device.

12. The system of claim 7, wherein the main server and the plurality of electronic devices comprise a server farm of a data storage center.

13. The system of claim 7, wherein each electronic device comprises a battery, a charger circuit and an inverter circuit, and wherein, for the sacrificial device, the charger circuit is decoupled from the battery and the inverter circuit is coupled to the battery.

14. The system of claim 13, wherein the inverter circuit converts DC power from the battery to the AC power to be supplied to the sacrificial device.

15. The system of claim 7, wherein: an electronic device that was previously not identified as a sacrificial device is identified as a new sacrificial device;
processing is deactivated for the electronic device identified as the new sacrificial device; and
the new sacrificial device supplies AC power to at least the new non-sacrificial device.

16. A method for providing a distributed uninterruptible power supply, the method comprising:
receiving, using one or more computing devices, an indication that a power outage occurred;
identifying, using the one or more computing devices, which of a plurality of electronic devices is a sacrificial device, wherein processing in the sacrificial devices may be suspended, wherein each electronic device comprises a battery;
deactivating, using the one or more computing devices, the processing of the sacrificial device;
coupling an inverter circuit to the battery for the sacrificial device, wherein the inverter circuit converts DC power from the battery to AC power supplied to one or more non-sacrificial devices;
identifying, using the one or more computing devices, the sacrificial device as a new non-sacrificial device when one or more processes associated with the one or more non-sacrificial devices are awaiting a result of a suspended process of the sacrificial device; and
activating, using the one or more computing devices, the new non-sacrificial device.

17. The method of claim 16, further comprising: identifying, using the one or more computing devices, as a new sacrificial device an electronic device that was previously not identified as a sacrificial device;
- deactivating, using the one or more computing devices, processing of the electronic device identified as the new sacrificial device; and
- supplying, using the one or more computing devices, AC power from the new sacrificial device to at least the new non-sacrificial device.

18. The method of claim 1, wherein the activating allows the one or more processes associated with the one or more non-sacrificial devices to complete processing based on the result.

19. The system of claim 7, wherein the activation allows the one or more processes associated with the one or more non-sacrificial devices to complete processing based on the result.

20. The method of claim 16, wherein the activating allows the one or more processes associated with the one or more non-sacrificial devices to complete processing based on the result.

\* \* \* \* \*